United States Patent [19]

Lennen

[11] Patent Number: 5,689,271
[45] Date of Patent: Nov. 18, 1997

[54] METHOD AND APPARATUS FOR CIVILIAN RECEIVER OPERATION WITH P(Y) CODE IN SATELLITE POSITIONING SYSTEM RECEIVER

[75] Inventor: Gary R. Lennen, Cupertino, Calif.

[73] Assignee: Trimble Navigation Limited, Sunnyvale, Calif.

[21] Appl. No.: 642,629

[22] Filed: May 3, 1996

[51] Int. Cl.⁶ .................................................. G01S 5/02
[52] U.S. Cl. ................................ 342/357; 342/352
[58] Field of Search ............................ 342/352, 357, 342/81; 455/12.1

[56] References Cited

U.S. PATENT DOCUMENTS

| | | | |
|---|---|---|---|
| 4,928,106 | 5/1990 | Ashjaee et al. | 342/352 |
| 4,972,431 | 11/1990 | Keegan | 375/1 |
| 5,293,170 | 3/1994 | Lorenz et al. | 342/352 |
| 5,541,606 | 7/1996 | Lennen | 342/357 |

*Primary Examiner*—Thomas H. Tarcza
*Assistant Examiner*—Dao L. Pham
*Attorney, Agent, or Firm*—Boris G. Tankhilevich

[57] ABSTRACT

The system and method of allowing the civilian GPS receivers to utilize the satellite transmitted P(Y) code signal without requiring the detailed P(Y) code to be revealed inside the receiver are disclosed. This is done by using the W code generator inside the civilian receiver, by integrating the W code signal across the W period, and by delaying the integrated signal to protect against the possible spoofing attack. The generator of the integrated and delayed W code signal is placed inside the tamper-proof container.

17 Claims, 7 Drawing Sheets

METHOD AND APPARATUS FOR CIVILIAN RECEIVER OPERATION WITH P(Y) CODE IN SATELLITE POSITIONING SYSTEM RECEIVER

BACKGROUND

The GPS is a system of satellite signal transmitters, with receivers located on the Earth's surface or adjacent to the Earth's surface, that transmit information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is a binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite (which includes complete information about the transmitting satellite within the next several hours of transmission) and an almanac for all GPS satellites (which includes less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=1,2, . . . 24) is the channel or satellite number. These frequencies lie in two bands at 1.597–1.617 GHz (L1) and 1,240–1,260 GHz (L2). The L1 code is modulated by a C/A- code (chip rate=0.511 MHz) and by a P-code (chip rate=5.11 MHz). The L2 code is presently modulated only by the P-code. The GLONASS satellites transmit navigational data at a rate of 50 Baud for C/A code and 100 Baud for P code. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemeris constants, the SATPS receiver can obtain the solution of the set of the four equations for its unknown coordinates ($x_0$, $y_0$, $z_0$) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SATPS receiver.

The C/A code modulated phase quadrature carrier component of the L1 signal is provided for commercial use. If the accuracy desired in the quantity being measured by the receiver is not great, it is sufficient to use only the L1 signal carrier. However, for applications where high resolution measurements or fast high integrity measurements are to be made, e.g. surveying and machine control, both the L1 carrier and the L2 carrier must also be used, which allows elimination of the unknown component of the time delay of the signals by the ionosphere.

To prevent jamming signals from being accepted as actual satellite signals, the satellites are provided with a secret Y-code, which replaces the known P-code when the "anti-spoofing" is ON. When the "anti-spoofing" is OFF, the Y-code is turned OFF, and the known P-code is used. Thus, the secret Y-code can be turned ON or OFF at will by the U.S. Government. The "anti-spoofing" allows the GPS system to be used for the military or other classified United States Government projects. It has been disclosed publicly that the secret Y-code is the modulo-two sum of the known P-code and the unknown W-code. Since the W-code is classified, the commercial GPS users employ different techniques to obtain the quasi-demodulation of the L2 signal.

The GPS signals are intended to be recovered by correlating each incoming signal with a locally generated replica of the code: P-code or C/A code. The result of such correlation is that the carrier in the GPS signals is totally suppressed when the modulating signal is a pseudo-range code sequence like the P-code or the C/A code. Thus, the received L2 signal contains no significant components at the L2 frequency. For survey applications it is important to be able to reconstruct the L2 carrier and to measure its phase and also to be able to measure the L2 pseudo-range. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrowband peak centered at the carrier frequency. The carrier recovered by correlation provides the best available signal-to-noise ratio (SNR). Although the L2 carrier cannot be recovered by this correlation process when the P code is encrypted, L2 can still be recovered by squaring (multiplying the signal by itself the incoming signal. This has an effect of removing all biphase modulation from the signal, and producing a single-frequency output signal at twice the frequency of the suppressed carrier. Thus, the L2 carrier can be obtained by squaring, regardless of whether or not the modulating P code is encrypted. However, squaring the signal also squares the noise component of the signal. The resulting SNR is seriously degraded (by 30 dB or more) as compared with the ratio for the carrier recovered by correlation. Moreover, squaring provides the half-wavelength carrier phase which is different from the L2 real wavelength carrier phase.

The variation of the squaring technique is proposed by Counselman III in U.S. Pat. No. 4,667,203, wherein the incoming signal is divided into upper and lower sidebands, which are multiplied together to obtain the second harmonic of the carrier signal. However, the degradation of the SNR is the same as with squaring the entire signal.

U.S. Pat. No. 4,972,431 issued to Keegan, discloses a different approach to the quasi-demodulation of the L2 signal. The incoming encrypted P-code GPS signal is not immediately squared. Instead, after mixing with a local oscillator signal to lower its frequency to an intermediate frequency, the encrypted P-code signal is correlated with a locally generated P-code signal. Since the locally generated P-code signal does not perfectly match the encrypted P-code sequence, the correlation does not produce a sharp peak in the frequency spectrum. The result of the correlation is filtered by a bandpass filter, and the reduced-bandwidth signal is squared. The squared signal is processed in a delay lock code loop to maximize the spectral peak. An error signal is generated and is fed back to control the generator of P code signal as to maximize the peak in the frequency spectrum of the output signal and to effectively lock onto the incoming L2 P code signal. Simultaneously, the second harmonic of the suppressed carrier signal resulting from the squaring process is processed to provide L2 carrier phase measurements. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve carrier integer ambiguities.

In U.S. Pat. No. 5,293,170 issued to Lorenz, the integration of the L1 and L2 signals after demodulation by locally generated carrier and P-code signals, is repetitively accomplished over a duration that is estimated to be the period of the modulation code. And further, the modulated code period is estimated to be an integer multiple of P chips. The invention assumes the knowledge of the timing of the unknown W-code, however, such W-code timing information is not available to the commercial user and cannot be recovered without knowledge of the classified W-code information.

What is needed is a method and an apparatus that would allow civilian satellite positioning system (SATPS) receivers to utilize the satellite-transmitted P(Y) signal without requiring the detailed P(Y) code to be revealed inside the receiver.

SUMMARY

The present invention is unique because it allows the design of a civilian satellite positioning system (SATPS) receiver capable of utilizing the satellite transmitted P(Y) signal without requiring the detailed knowledge of the P(Y) code. This can be done by integrating and delaying the secret P(Y) code so that only the integrated and delayed ΣP(Y) code is used to improve the characteristics of the SATPS civilian receiver.

One aspect of the present invention is directed to a system for employing certain characteristics of the P(Y) code in the civilian Satellite Positioning System (SATPS) receiver. The system comprises a RECEIVING MEANS for (1) receiving a known C/A code modulated on L1 carrier frequency; (2) receiving an unknown Y code modulated on L1 carrier frequency signal; and (3) for receiving an unknown Y code modulated on L2 carrier frequency signal from at least one satellite. The received L1, and L2 signals contain propagation noise. The Y code comprises a known P code and an unknown W code.

The system further comprises at least one DIGITAL CHANNEL PROCESSING MEANS for: (1) locally generating replica of the C/A code modulated on L1 carrier frequency signal; (2) locally generating replica of the P code modulated on L1 carrier frequency signal; (3) locally generating replica of the P code modulated on L2 carrier frequency signal; (4) locally generating replica of a L 1 G code whose power spectrum characteristics are similar to the unknown W code modulated on L1 carrier frequency signal; (5) locally generating replica of a L2 G code whose power spectrum characteristics are similar to the unknown W code modulated on L2 carrier frequency signal; (6) correlating a locally generated replica of C/A code with the received L1 code for obtaining an estimate of L1 group delay (L1 pseudo-range) and L1 carrier phase; and (7) demodulating the satellite data stream.

The RECEIVING MEANS further comprises: (1) a dual frequency patch ANTENNA MEANS for receiving the L1 and L2 satellite signals; (2) a FILTER/LNA MEANS for performing filtering and low noise amplification of the L1 and L2 signals; (3) a DOWNCONVERTER MEANS for mixing and converting the L1 and L2 signals; and (4) an IF PROCESSOR MEANS for transforming the converted L1 and L2 signals into digitally sampled quadrature versions of L1 and L2 signals (IL1, QL1, IL2, QL2).

Each DIGITAL CHANNEL PROCESSING MEANS further comprises:

(1) an L1 DIGITAL CHANNEL PROCESSOR MEANS for tracking L1 C/A code and for tracking L1 P(G) code; and (2) a MICROPROCESSOR MEANS system.

In the preferred embodiment, the L1 DIGITAL CHANNEL PROCESSING MEANS further comprises: (1) a carrier numerically controlled oscillator (CARRIER NCO MEANS); (2) a CARRIER MIXER MEANS for multiplying outputted by the IF PROCESSOR MEANS digitized inphase IL1, and Q L1 signals having carrier frequency with, outputted by the CARRIER NCO MEANS, inphase and quadrature components of digital carrier; wherein the CARRIER MIXER MEANS outputs inphase IL1 and quadrature Q L1 signals having zero carrier frequency; (3) a CODE MIXER and GENERATOR MEANS for providing a locally generated replica of C/A code; (4) a CODE MIXER MEANS for code-correlating the CARRIER MIXER MEANS output signals with the locally generated replica of C/A code; wherein when the L1 DIGITAL CHANNEL PROCESSING MEANS's carrier tracking loop is closed via the CARRIER NCO MEANS the input to the CODE MIXER MEANS represents the satellite signal L1 C/A code; and wherein the CODE MIXER MEANS performs the code correlation at 3 time points (early (E), punctual (P), and late (L)) on the autocorrelation function graph, creating E, P, and L samples of the autocorrelation function; (5) a block C/A CODE CORRELATORS MEANS for integrating the early, punctual and late samples of the autocorrelation function over an integer multiple of $C/A_{EPOCH}$ signals; wherein the C/A CODE CORRELATORS MEANS outputs early (E), punctual (P), and late (L) components of the C/A signal in inphase (I) and quadrature (Q) channels ($E_{I\,C/A}$, $P_{I\,C/A}$, $L_{I\,C/A}$, $E_{Q\,C/A}$, $P_{Q\,C/A}$, $L_{Q\,C/A}$) that are fed to the MICROPROCESSOR SYSTEM MEANS at a rate of L1 $C/A_{EPOCH}$, and wherein the MICROPROCESSOR SYSTEM MEANS uses the C/A CODE CORRELATORS MEANS output signals to facilitate tracing of the C/A signal and to develop feedback signals for the L1 carrier tracking loop and for the L1 code tracking loop; and (6) a P(G) CODE CORRELATORS MEANS for generating the signals ($E_{I\,P(G)}$, $P_{I\,P(G)}$, $L_{I\,P(G)}$, $E_{Q\,P(G)}$, $P_{Q\,P(G)}$, $L_{Q\,P(G)}$) MICROPROCESSOR SYSTEM to facilitate tracking of the P(G) signal, and to develop feedback signals for the L1 carrier tracking loop and for the L1 code tracking loop.

The CODE MIXER and GENERATOR MEANS further comprises: (1) a CODE NCO MEANS using a sampling clock SCLK for generating a first clocking signal at the P code rate, wherein the first clocking signal can be altered using the MICROPROCESSOR CONTROL signal to facilitate the code tracking; (2) a DIVIDING MEANS for dividing the first clocking signal and for generating a second clocking signal at C/A code clocking rate; (3) a C/A CODE GENERATOR MEANS for generating a C/A code signal and a $C/A_{EPOCH}$ signal under the CONTROL signal of the MICROPROCESSOR MEANS, wherein the C/A code signal is the locally generated C/A code used in C/A tracking, and wherein the $C/A_{EPOCH}$ signal is the repetition rate of the C/A code; (4) a P CODE GENERATOR MEANS clocked by the first clocking signal under the CONTROL signal of the MICROPROCESSOR MEANS, wherein the P CODE GENERATOR generates a P code signal, an X1 signal, and a X1A signal for driving a G CODE GENERATOR; (5) a W SYNC GENERATOR MEANS connected to the CODE NCO MEANS for dividing the first clocking signal by N, N being an integer, for generating an output signal $W_{sync}$, and for synchronizing the $W_{sync}$ signal to the $C/A_{EPOCH}$ signal; (6) a G CODE GENERATOR for generating a G code signal; (7) a CODE MIXER 1 MEANS for mixing I inphase (I) and quadrature (Q) versions of an incoming signal with the locally generated P code signal, and for generating inphase and quadrature early (E), punctual (P), and late (L), versions of the elected satellite's W code signal ($I_{P\_EPL}$ and $Q_{P\_EPL}$); (8) a SUMMER DELAY BLOCK MEANS for further processing the $I_{P\_EPL}$ and $Q_{P\_EPL}$ signals by integrating the $I_{P\_EPL}$ and $Q_{P\_EPL}$ signals across the period $W_{Sync}$, and for delaying the integrated $\Sigma I_{P\_EPL}$ and $\Sigma Q_{P\_EPL}$ signals by a variable integer number K of $W_{Sync}$ periods; and (9) a CODE MIXER 2 MEANS for mixing the generated, delayed, and integrated $\Sigma I_{P\_EPL}$ and $\Sigma Q_{P\_EPL}$ signals with the G code signal, and for generating output signals $I_{EPL}$ and $Q_{EPL}$ for further integration in the P(G) CODE CORRELATORS BLOCK.

In the preferred embodiment, the W SYNC GENERATOR MEANS comprises a W SYNC BLOCK for dividing the first clocking signal by 22.

The SUMMER DELAY BLOCK MEANS further comprises: (1) a DIGITAL SUMMER 1, a DIGITAL SUMMER 2, and a DIGITAL SUMMER 3 for integrating the inphase version I of the elected satellite's W code signal $I_{P\_EPL}$ across the period $W_{Sync}$; (2) a DIGITAL DELAY 1, a DIGITAL DELAY 2, and a DIGITAL DELAY 3 for delaying the integrated $\Sigma I_{P\_EPL}$ by a variable integer number of $W_{Sync}$ periods; (3) a DIGITAL SUMMER 4, a DIGITAL SUMMER 5, and a DIGITAL SUMMER 6 for integrating the quadrature version Q of the elected satellite's W code signal $Q_{P\_EPL}$ across the period $W_{Sync}$; (4) and a DIGITAL DELAY 4, a DIGITAL DELAY 5, and a DIGITAL DELAY 6 for delaying the integrated $\Sigma Q_{P\_EPL}$ by a variable integer number of $W_{Sync}$ periods.

In one embodiment, the G CODE GENERATOR comprises: (1) a W CODE GENERATOR MEANS for generating a W code with an unknown variable underlying clocking rate; (2) a DIGITAL SUMMER MEANS for integrating the W code signal across the period $W_{Sync}$; wherein a top bit of the integrated signal forms a G code signal comprising a string of '1's and '0's at a rate of $W_{Sync}$ clocks; and (3) a DIGITAL DELAY for variably delaying the G code by K $W_{Sync}$ clocks in order to prevent the effective transmission of a spoofing signal.

The W SYNC GENERATOR MEANS comprises: a ZERO FREQUENCY $F_0$ MEANS for multiplying the NCO clocking signal by the zero frequency $F_0$ of the W-code energy spectrum; wherein the zero-frequency $F_0$ is the first frequency at which the W-code energy spectrum is equal to zero; and wherein the W SYNC GENERATOR MEANS generates the $W_{sync}$ clock signal.

In the preferred embodiment, the ZERO FREQUENCY $F_0$ MEANS further comprises a DIVIDE BY 22 MEANS; wherein the W SYNC GENERATOR MEANS generates a 22 P(Y) clock signal.

The CODE MIXER 2 further comprises: a first MIXER BLOCK for mixing the delayed and integrated inphase $\Sigma I_{P\_EPL}$ signals with the G code signal, and for generating output signals $I_{EPL}$ for further integration in the P(G) CODE CORRELATORS BLOCK; and a second MIXER BLOCK for mixing the delayed and integrated quadrature $\Sigma Q_{P\_EPL}$ signals with the G code signal, and for generating output signals $Q_{EPL}$ for further integration in the P(G) CODE CORRELATORS BLOCK.

In one embodiment, the DIGITAL SUMMER MEANS further comprises: (1) an ADDER MEANS for inputting an input signal $SIGNAL_{IN}$; (2) a LATCH 1 MEANS, wherein the $W_{Sync}$ signal clears the LATCH 1 for preparation for the next accumulation; and wherein the LATCH 1 and the ADDER perform the accumulation of the input signal $SIGNAL_{IN}$ over the period of $W_{Sync}$ signal; (3) a LATCH 2 MEANS for latching in the $W_{sync}$ signal; and (4) a COMPARATOR for producing an output $W_{out}$ signal; wherein the $W_{out}$ signal is equal to the MSB (most significant bit) of the input signal accumulation $\Sigma(SIGNAL_{IN})$ over the period of a $W_{Sync}$ signal.

In one embodiment, the DIGITAL DELAY MEANS further comprises: a SHIFT REGISTER MEANS for delaying an input signal by an integer number M of $W_{Sync}$ clocks; and a MULTIPLEXER MEANS for selecting the integer number M under a CONTROL signal.

One more aspect of the present invention is directed to a method for utilizing the satellite transmitted P(Y) signal without requiring the detailed P(Y) code to be revealed inside the receiver. The method comprises the steps of: (1) receiving a known C/A code modulated on L1 carrier frequency; (2) receiving an unknown Y code modulated on L1 carrier frequency signal; (3) receiving an unknown Y code modulated on L2 carrier frequency signal from at least one satellite; wherein the received L1 and L2 signals contain propagation noise; and wherein the Y code comprises a known P code and an unknown W code; (4) locally generating replica of the C/A code modulated on L1 carrier frequency signal; (5) locally generating replica of the P code modulated on L1 carrier frequency signal; (6) locally generating replica of the P code modulated on L2 carrier frequency signal; (7) locally generating replica of a L1 G code whose power spectrum characteristics are similar to the unknown W code modulated on L1 carrier frequency signal; (8) locally generating replica of a L2 G code whose power spectrum characteristics are similar to the unknown W code modulated on L2 carrier frequency signal; (9) correlating a locally generated replica of C/A code with the received L1 code for obtaining an estimate of L1 group delay (L1 pseudo-range) and L1 carrier phase; and (10) demodulating the satellite data stream.

FULL DESCRIPTION OF THE PREFERRED EMBODIMENT

When GPS satellites are encrypted, as is normally the case, they transmit C/A code and P(Y) code on L1 (1575.42 MHz) and P(Y) code on L2 (1227.6 MHz). The C/A code is a known civilian access code (see the document GPS Interface Control Document ICD-GPS- 200, published by Rockwell International Corporation, Satellite Systems Division, Revision B-PR, 3 Jul. 1991, which is incorporated by reference herein). The P(Y) code is a classified secret code. In order to gain full access, in terms of tracking, to the P(Y) code signal, a receiver must be able to generate a replica of the P(Y) code. Current state of the art receivers which require access to the P(Y) code signal must contain two special integrated circuits, known as the Auxiliary Output Chip (AOC) and the Precise Positioning System—Security Module (PPS-SM). One of the security issues with receivers that use these integrated circuits (ICs) is that they generate a noiseless copy of the P(Y) code. This is undesirable because it allows a relatively easy access to analysis of the signal and potential retransmission for the purposes of spoofing, that is an attempt to confuse GPS receivers by mimicking the satellites signal.

However, the civilian access to P(Y) code is particularly advantageous when applied to the L2 signal which transmits only P(Y) code, because L2 measurements allow civilian receivers to measure ionospheric errors and resolve carrier cycle ambiguities with higher integrity. Thus, it is highly important to have a civilian GPS receiver with some access to P(Y) code structure within the civilian GPS receiver with anti-spoofing capability. This represents the subject of the present invention.

Figure 1:
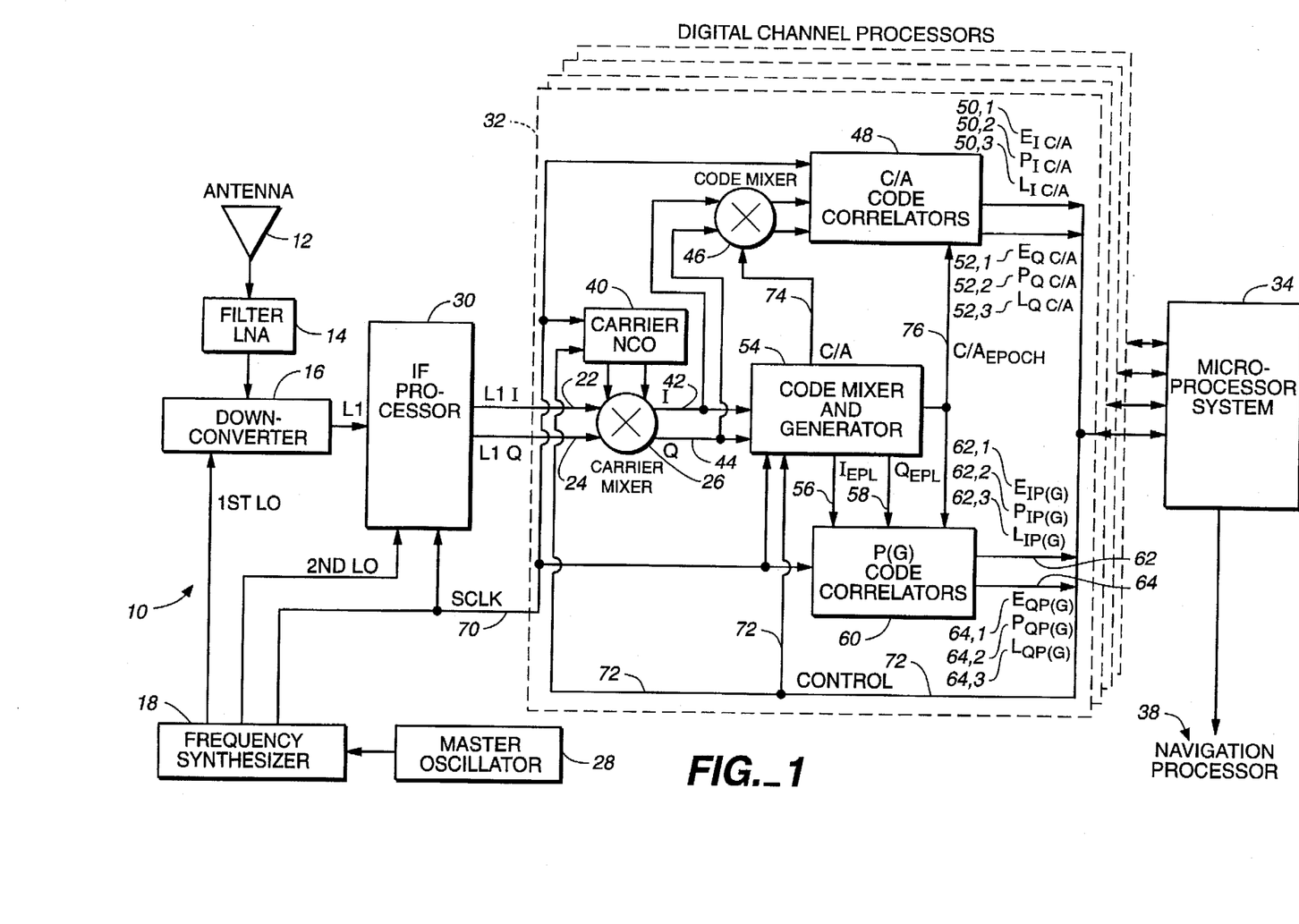
FIG. 1 illustrates a simplified block-diagram of the GPS RECEIVER having two major parts—a RECEIVER and a DIGITAL CHANNEL PROCESSOR.

FIG. 1 illustrates a block diagram 10 of the GPS RECEIVER using the P(Y) code with an anti-spoofing capability. Each satellite generates different signals and they are processed by different DIGITAL CHANNEL PROCESSORS, which operate exactly the same way.

FIG. 1 is an overview of the GPS receiver, all elements of which are explained in detail below. The GPS signals (L1=1575.42 MHz, L2=1227.60 MHz) enter through a dual frequency patch ANTENNA 12. The GPS ANTENNA may be a magnetically mountable model 21423-00 commercially available from Trimble Navigation of Sunnyvale, Calif. The MASTER OSCILLATOR 28 provides the reference oscillator which drives all other clocks in the system. The FREQUENCY SYNTHESIZER 18 takes the output of the MASTER OSCILLATOR and generates important clock and local oscillator frequencies used throughout the system.

A FILTER/LNA 14 performs filtering and low noise amplification of both L1 and L2 signals. The noise figure of the RECEIVER system is dictated by the performance of the FILTER/LNA combination. The DOWNCONVERTER 16 mixes both L1 and L2 signals in frequency down to approximately 175 MHz and outputs the analogue L1 and L2 signals into an IF PROCESSOR 30. The IF PROCESSOR takes the analog L1 and L2 signals at approximately 175 MHz and converts them into the digitally-sampled L1 and L2 inphase and quadrature signals at carrier frequencies 420 KHz for L1 and at 2.6 MHz for L2 signals respectively.

At least one DIGITAL CHANNEL PROCESSOR 32 inputs the digitally sampled L1 and L2 inphase and quadrature signals. All DIGITAL CHANNEL processors are identical by design and operate on identical input samples. Each DIGITAL CHANNEL PROCESSOR is designed to digitally track the L1 and L2 signals produced by one satellite by tracking code and carrier signals and to perform code and carrier phase measurements in conjunction with the MICROPROCESSOR SYSTEM 34. One DIGITAL CHANNEL PROCESSOR is capable of tracking one satellite in both L1 and L2 channels. MICROPROCESSOR SYSTEM is a general purpose computing device which facilitates tracking and measurements processes, providing pseudo-range and carrier phase measurements for a NAVIGATION PROCESSOR 38. The NAVIGATION PROCESSOR performs the higher level function of combining measurements in such a way as to produce position, velocity and time information for the differential and surveying functions.

The invention will be described in terms of L1 tracking, but the disclosure is equally applicable to L2 tracking.

The digitized inphase IL1 (22) and quadrature QL1 (24) versions of the incoming signal are frequency translated to 0 Hz via a CARRIER NCO 40 and a CARRIER MIXER 26. The resulting I (42) and Q (44) signals containing the satellite code are further processed via a CODE MIXER 46 and C/A CODE CORRELATORS 48 to generate the inphase (I) early $E_{I\ C/A}$ (50,1), punctual $P_{I\ C/A}$ (50,2), and late $L_{I\ C/A}$ (50,3) signals, and the quadrature (Q) early $E_{Q\ C/A}$ (52,1), punctual $P_{Q\ C/A}$ (52,2), and late $L_{Q\ C/A}$ (52,3) signals. These signals are read by the MICROPROCESSOR SYSTEM 34 to facilitate tracking of the L1 C/A code signal.

The resulting I (42) and Q (44) signals including the satellite code are also further processed by the CODE MIXER and GENERATOR (54) and by the P(G) CODE CORRELATORS (60) to generate the inphase (I) early $E_{I\ P(G)}$ (62,1), punctual $P_{I\ P(G)}$ (62,2), and late L (62,3) signals, and the quadrature (Q) early $E_{Q\ P(G)}$ (64,1), punctual $P_{Q\ P(G)}$ (64,2), and late $L_{Q\ P(G)}$ (64,3) signals which are read by the MICROPROCESSOR SYSTEM (34) to facilitate tracking of the P(Y) code signal.

Figure 2:
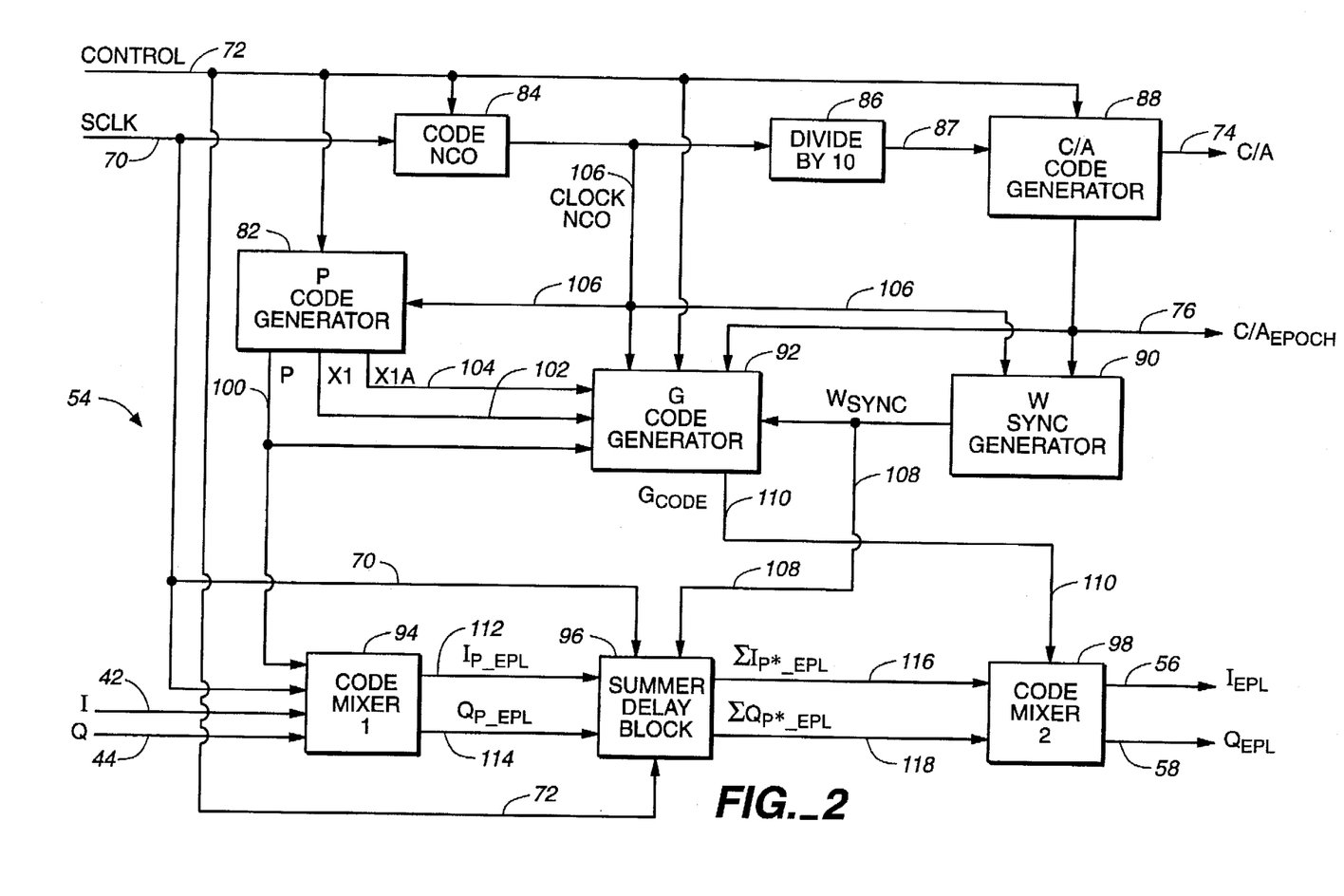
FIG. 2 shows a CODE MIXER and GENERATOR.

FIG. 2 depicts the CODE MIXER and GENERATOR 54 of FIG. 1. The CODE NCO 84 generates a clock at the P code rate (10.23 MHz) from the sampling clock SCLK 70. The CODE NCO output phase can be altered under the MICROPROCESSOR Control signal 72 to facilitate the code tracking. The NCO clock signal 106 is processed by the DIVIDE BY 10 block 86 to provide a C/A code rate clock (1.023 MHz) to drive the C/A CODE GENERATOR (88). The C/A CODE GENERATOR (88) and the P CODE GENERATOR (82) are fully described in the document ICD-GPS-200 incorporated by reference herein.

The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The RECEIVER can track the received GPS signals having very low signal levels by using a Delay-Lock Loop. The essential element of the Delay-Lock Loop is the block C/A CODE CORRELATORS (48) of FIG. 1, wherein the received code is multiplied by a reference code having a time offset $\tau<T$; T being a code chip interval. The code correlation is performed at 3 time points (E-early, P-punctual and L-late) on the autocorrelation function graph. The E, P, and L samples of the autocorrelation function are integrated in the block C/A CODE CORRELATORS (48). The CORRELATORS output provides an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (the block CODE NCO 84 of FIG. 2) or clock. The divided-by-10 (in the preferred embodiment) clock CODE NCO in turn drives the C/A CODE GENERATOR (block (88) of FIG. 2) in such a manner that if the clock is lagging in phase, the correction signal drives the clock faster and the reference code speeds up and runs in coincidence with the received signal. Thus, the reference code is tracking the received code. The C/A CODE GENERATOR 88 provides a C/A code 74 and a $C/A_{EPOCH}$ timing signal 76. The $C/A_{EPOCH}$ timing signal 76 is a standard repetition rate signal (1 kHz) synchronized to the state of the C/A CODE GENERATOR that measures the timing of the received signal.

Referring again to FIG. 2, the P CODE GENERATOR 82 (see ICD-GPS-200) produces a number of standard signals P (100), X1 (102), and X1A (104) which drive the G CODE GENERATOR 92. In the preferred embodiment, the W SYNC GENERATOR (90) divides the NCO clock signal by 22 and synchronizes the output, $W_{Sync}$ (108), to the $C/A_{EPOCH}$ timing signal 76.

It is known that the I (42) and Q (44) versions of the incoming signal contain the Y code comprising the known P code and an unknown slower rate W code. Therefore, when the incoming signals I (42) and Q (44), containing the W code, are mixed with the early, punctual, and late versions of the locally generated P code (100) in the CODE MIXER 1 (94), the CODE MIXER 1 outputs inphase $I_{P\_EPL}$ (112) and quadrature $Q_{P\_EPL}$ (114) versions of the satellite's W code.

The output of CODE MIXER 1 is further processed by a SUMMER DELAY BLOCK (96). The integrated and delayed, inphase $\Sigma I_{P\_EPL}$ (116) and quadrature $\Sigma Q_{P\_EPL}$ (118), output signals of the SUMMER DELAY BLOCK are mixed with the G code signal (110) in a CODE MIXER 2 (98). The anti-spoofing G code is designed to emulate the secret W code signal without revealing its underlying content. This objective can be achieved by implementing the variable delay of the incoming signal in the SUMMER DELAY BLOCK 96 and by implementing the variable delay inside the G CODE GENERATOR 92 (see FIG. 5). Indeed, the inphase $\Sigma I_{P\_EPL}$ (116) and quadrature $\Sigma Q_{P\_EPL}$ (118) versions of the incoming signal and the locally generated G code signal will correlate only if the delay is the same and if the incoming signal and the G code have the same synchronized clocks. The spoofer can try to emulate the actual satellite signal by sending the decoy signal some time T before the actual signal to compensate for a delay $\Delta$ that the satellite signal experiences before reaching the receiver. To avoid that, we can make a variable delay under the control signal 72 of the MICROPROCESSOR within the SUMMER DELAY BLOCK 96 and the G CODE GENERATOR block 92.

Figure 4A:
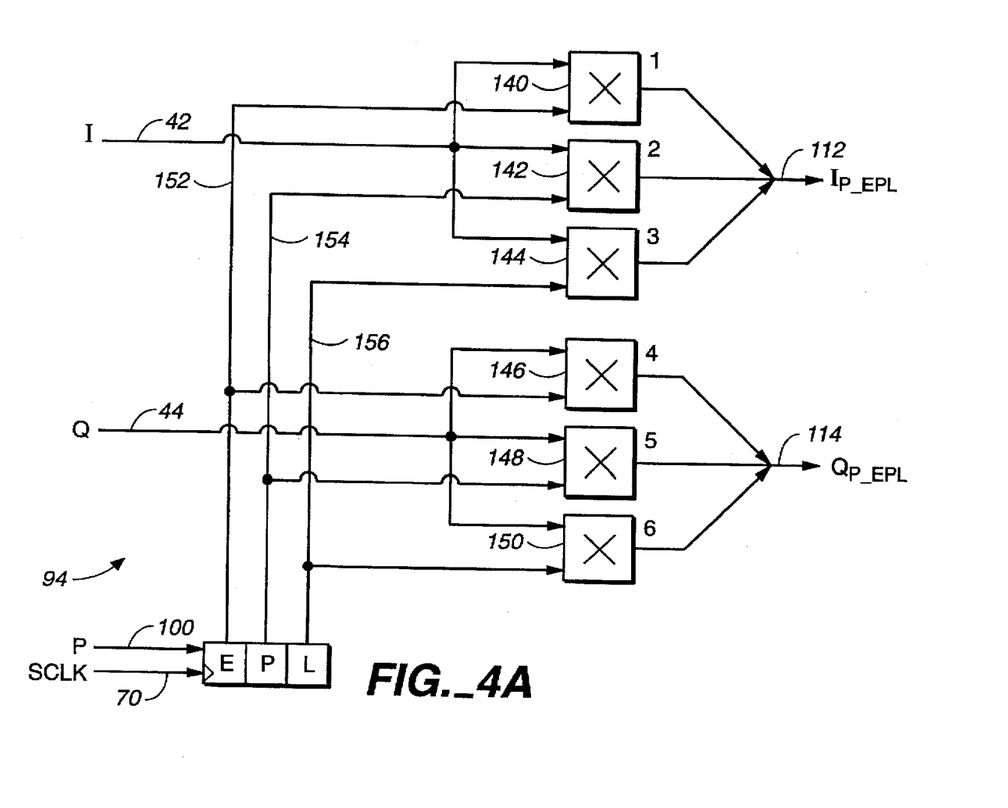
FIG. 4A illustrates a CODE MIXER 1.
Figure 4B:
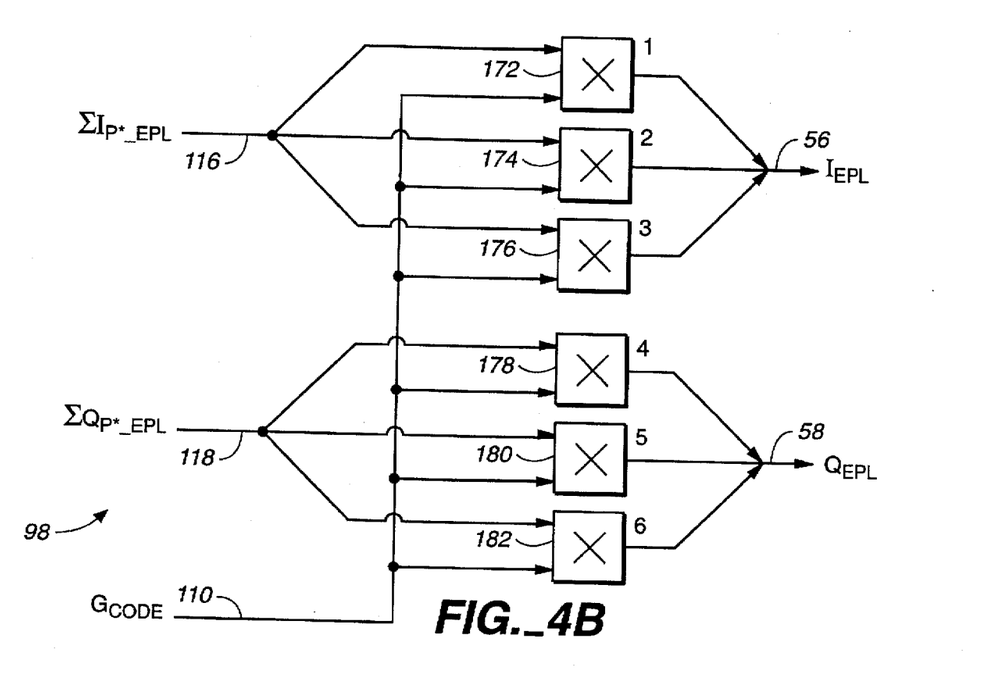
FIG. 4B shows a CODE MIXER 2.

The output signals of CODE MIXER 2 ($I_{EPL}$ (56) and $Q_{EPL}$ (58)) are sent for further integration in the P(G) CODE CORRELATORS BLOCK 60 (see FIG. 1). FIGS. 4A and 4B are self explanatory.

Figure 3:
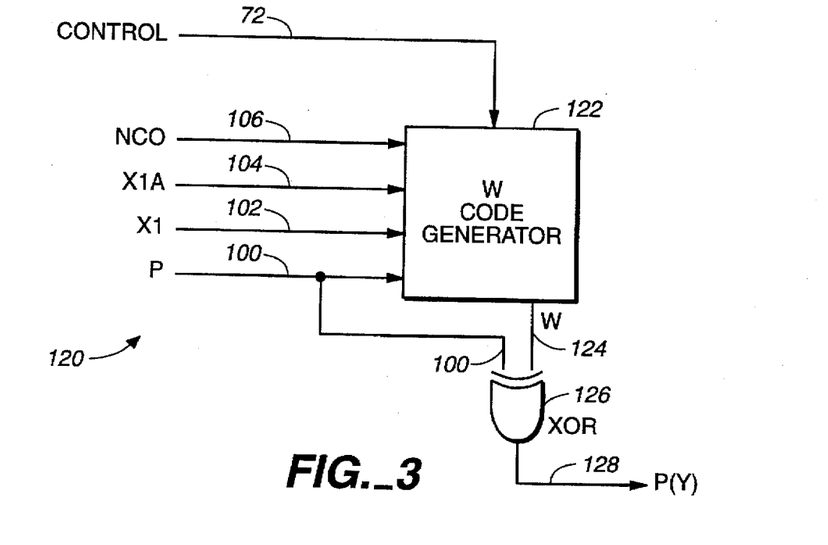
FIG. 3 depicts a P(Y) CODE GENERATOR.

FIG. 3 shows the W CODE GENERATOR 122 that can generate the actual noiseless W code. This block is utilized in the G CODE GENERATOR 92 depicted in FIG. 5 in order to generate the G code 110 used in the present invention. Normally, the W CODE GENERATOR is housed in a tamper-proof integrated circuit package. The G CODE GENERATOR should also be tamper-proof. The G CODE GENERATOR 92 comprises a W CODE GENERATOR 122 which produces W code 124 as in a normal P(Y) code receiver. The W signal represents the signal the invention is designed to disguise because it is assumed that the detailed analysis of the W code signal may lead to a 'breaking' of the W CODE GENERATOR.

Figure 5:
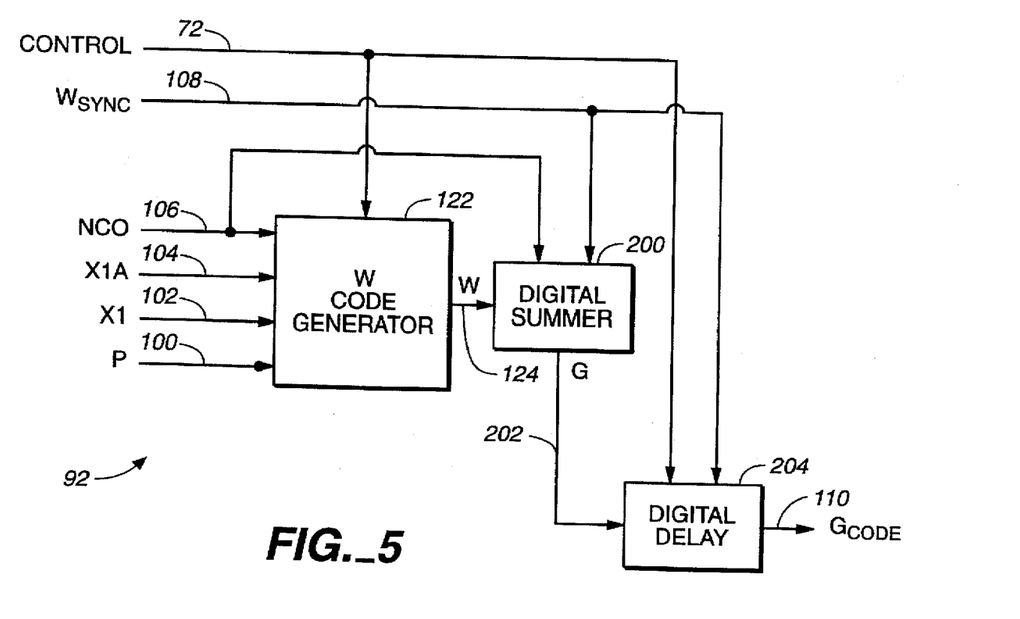
FIG. 5 is an illustration of a G CODE GENERATOR.
Figure 6:
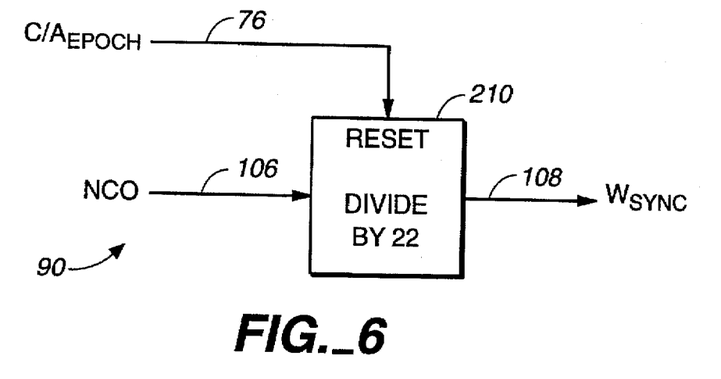
FIG. 6 depicts a W SYNC GENERATOR.
Figure 10:
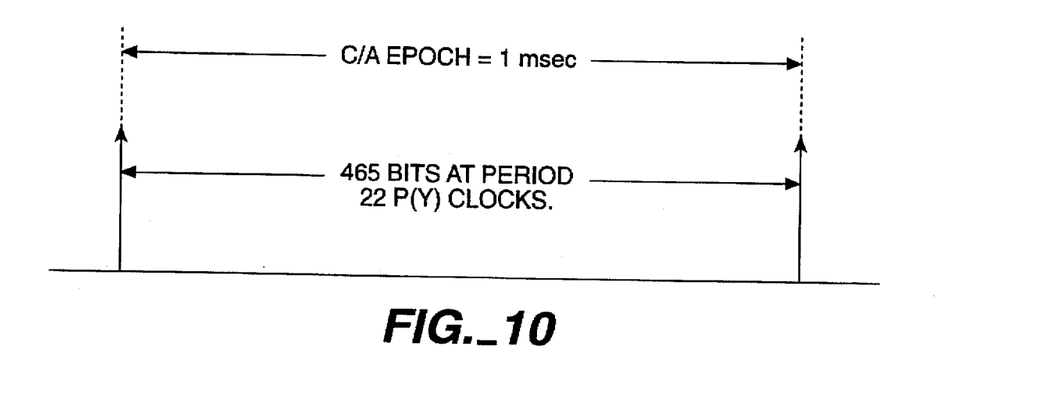
FIG. 10 is an illustration of W code Power Analysis.

To avoid the 'breaking' of the W CODE GENERATOR, the W code signal is further processed via the DIGITAL SUMMER BLOCK 200. The W signal is integrated across the period $W_{Sync}$ and the top bit of this integration forms the signal G 202. It is known that the W code has a variable underlying clocking rate. In the preferred embodiment, the DIGITAL SUMMER 200 masks this clocking rate with a constant rate of 22 P(Y) chips. The period of 22 P(Y) chips is chosen because a satellite W code transmission analysis showed near optimal power output when integrating the W code across this period while synchronized to the $C/A_{EPOCH}$ signal (see FIG. 10). Thus, the output G signal 202 of the DIGITAL SUMMER 200 comprises a string of '1's and '0's at a rate of 22 P(Y) clocks.

The G code 202 is further processed in the DIGITAL DELAY BLOCK 204 with a variable delay. The variable delay is needed to prevent the effective transmission of a spoofing signal as fully discussed above. The software initiation of the G CODE GENERATOR must be secure also for this to be effective.

Figure 7:
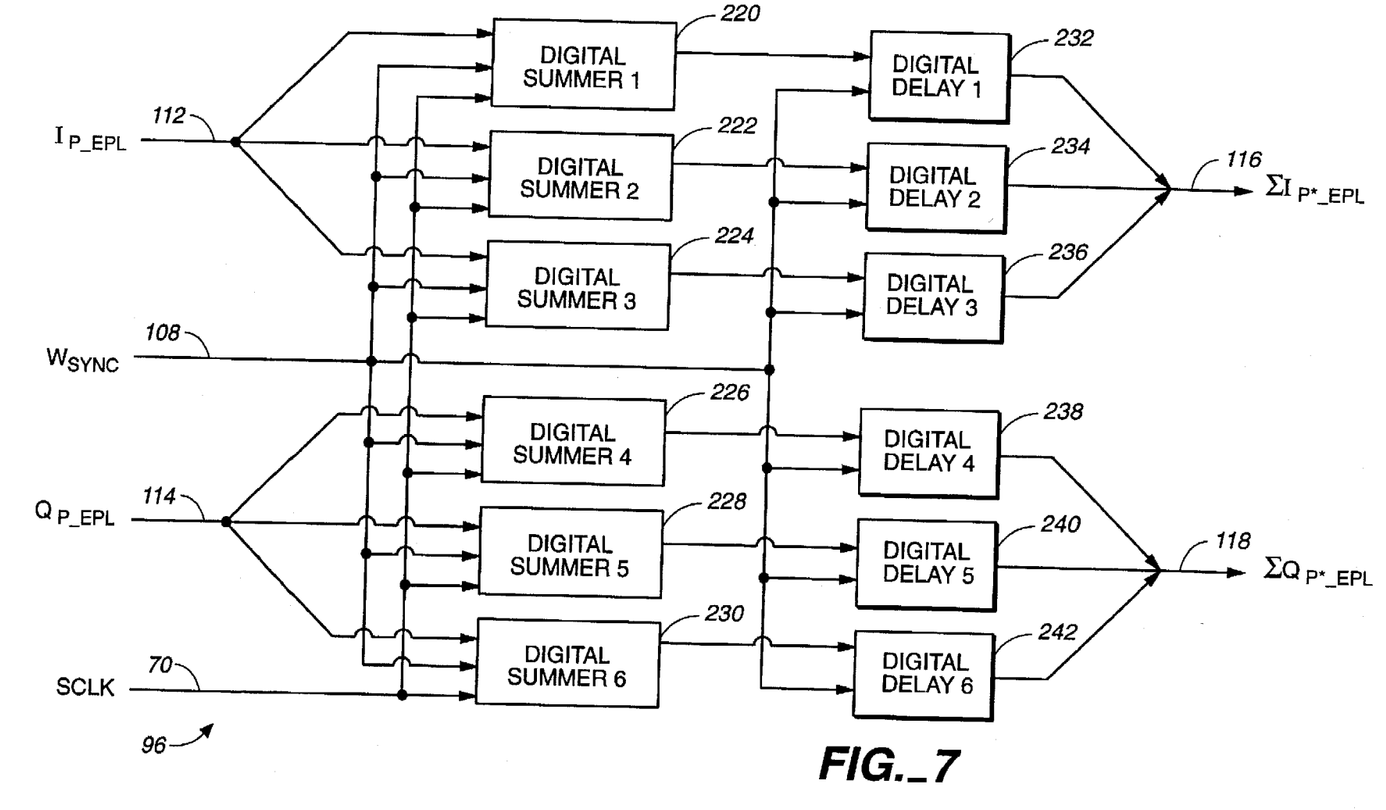
FIG. 7 shows a SUMMER DELAY BLOCK.
Figure 8:
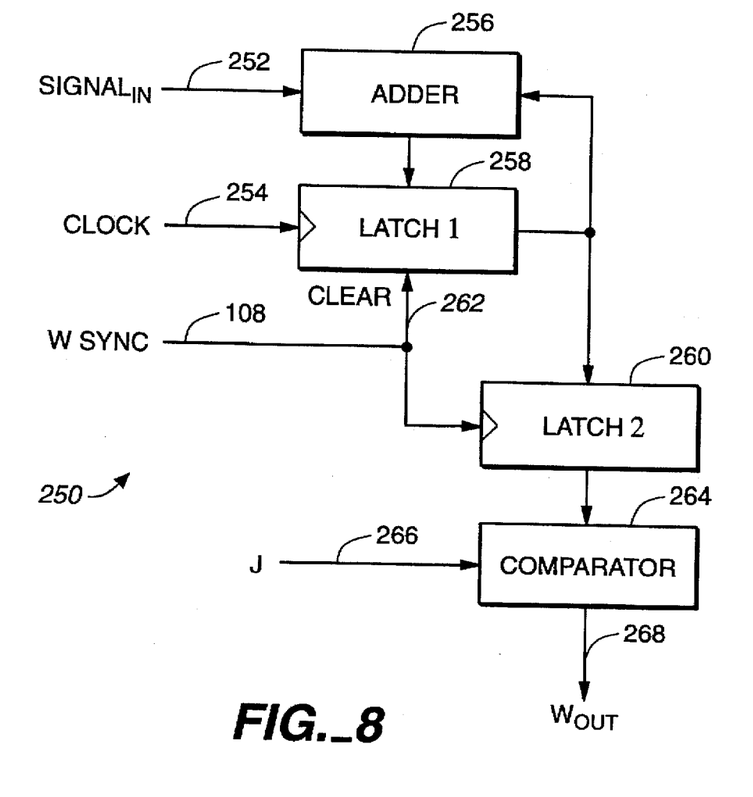
FIG. 8 illustrates a DIGITAL SUMMER.

FIG. 8 depicts in general a DIGITAL SUMMER BLOCK 250 that is used in the SUMMER DELAY BLOCK 96 of FIG. 2 (see also blocks 220–230 of FIG. 7) and in the G CODE GENERATOR 92 of FIG. 5 (see block DIGITAL SUMMER 200 of FIG. 5). The LATCH 1 (158) and the ADDER (256) together form an accumulator that accumulates signal samples over the period $W_{Sync}$ before being outputted via LATCH 2 260 at a rate of $W_{Sync}$.

In the DIGITAL SUMMER 200 of the G CODE GENERATOR 92, only the top bit of the accumulated input signal is used. The COMPARATOR 264 performs the comparison of the value of the accumulated input signal against the value J (266), wherein the value J is midway between the smallest and the largest possible LATCH 2 output value.

EXAMPLE

P code=10.23 MHz.

SCLK=25 MHz.

If $W_{Sync}$=22 P chips=22×25/10.23 SCLKs, than the number of samples is equal approximately to 54.

The range of the input signal $SIGNAL_{IN}$ is 0 or 1.

Range of the LATCH 2 output is 0–54.

Thus, J=54/2=27.

In the DIGITAL SUMMER of the SUMMER DELAY BLOCK of FIG. 7 the multiple bits are used to preserve the signals quality and the COMPARATOR 264 is not needed.

Figure 9:
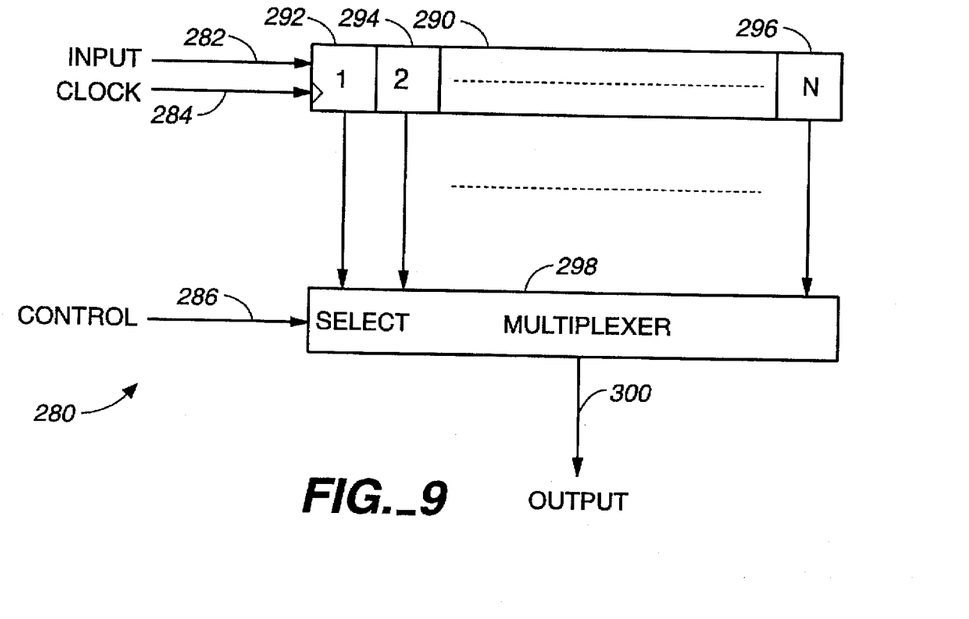
FIG. 9 is a depiction of a DIGITAL DELAY.

The DIGITAL DELAY of FIG. 9 with a variable delay is used both in the SUMMER DELAY BLOCK 96 of FIG. 2 (see also blocks 232–242 of FIG. 7) and in the G CODE GENERATOR 92 of FIG. 5 (see the block DIGITAL DELAY 204 of FIG. 5). The input signal 282 is variably delayed in a shift register 290 by an integer number of $W_{Sync}$ clocks. The MULTIPLEXER 298 makes this delay variable under the control signal 286 generated by the MICROPROCESSOR 34.

A method for utilizing the satellite-transmitted P(Y) signal without requiring the detailed P(Y) code to be revealed inside the receiver comprises the following steps. At first, the satellite signal from at least one satellite has to be received. The satellite signal includes a known C/A code modulated on L1 carrier frequency, an unknown Y code modulated on L1 carrier frequency signal, and an unknown Y code modulated on L2 carrier frequency signal. The received L1, and L2 signals contain propagation noise; and the Y code comprises a known P code and an unknown W code.

The second step is a step of locally generating replica of the C/A code modulated on L1 carrier frequency signal, replica of the P code modulated on L1 carrier frequency signal, replica of the P code modulated on L2 carrier frequency signal, replica of a L1 G code whose power spectrum characteristics are similar to the unknown W code modulated on L1 carrier frequency signal, and replica of an L2 G code whose power spectrum characteristics are similar to the unknown W code modulated on L2 carrier frequency signal.

The following step is a step of correlating a locally generated replica of C/A code with the received L1 code for obtaining an estimate of L1 group delay (L1 pseudo-range) and L1 carrier phase. Finally, the system performs a step of demodulation of the satellite data stream.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for employing certain characteristics of the P(Y) code in the civilian Satellite Positioning System (SATPS) receiver, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:

(1) locally generating replica of said C/A code modulated on L1 carrier frequency signal;

(2) locally generating replica of said P code modulated on L1 carrier frequency signal;

(3) locally generating replica of said P code modulated on L2 carrier frequency signal;

(4) locally generating replica of a L1 G code whose power spectrum characteristics are similar to the unknown W code modulated on L1 carrier frequency signal;

(5) locally generating replica of a L2 G code whose power spectrum characteristics are similar to the unknown W code modulated on L2 carrier frequency signal;

(6) correlating a locally generated replica of C/A code with the received L1 code for obtaining an estimate of L1 group delay (L1 pseudo-range) and L1 carrier phase; and (7) demodulating the satellite data stream.

2. The system of claim 1, wherein said RECEIVING MEANS further comprises:

a dual frequency patch ANTENNA MEANS for receiving said L1 and L2 satellite signals;

a FILTER/LNA MEANS conductively connected to said ANTENNA MEANS for performing filtering and low noise amplification of said L1 and L2 signals, wherein said FILTER/LNA determines the signal/noise ratio of the received signals L1 and L2;

a DOWNCONVERTER MEANS conductively connected to said FILTER/LNA MEANS for mixing and converting said L1 and L2 signals; and an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2).

3. The system of claim 2 further comprising a MASTER OSCILLATOR MEANS and a FREQUENCY SYNTHESIZER MEANS conductively connected to said MASTER OSCILLATOR MEANS, conductively connected to said IF PROCESSOR MEANS, conductively connected to said DOWNCONVERTER MEANS, and conductively connected to at least one said DIGITAL CHANNEL PROCESSING MEANS, wherein said FREQUENCY SYNTHESIZER MEANS generates several timing signals.

4. The system of claim 1, wherein each said DIGITAL CHANNEL PROCESSING MEANS further comprises:

an L1 DIGITAL CHANNEL PROCESSOR MEANS for tracking L1 C/A code and for tracking L1 P(G) code; and a MICROPROCESSOR MEANS system connected to said L1 DIGITAL CHANNEL PROCESSOR MEANS;

wherein said L1 DIGITAL CHANNEL PROCESSING MEANS is fed by digitized inphase IL1 and quadrature QL1 of L1 signal outputted by said IF PROCESSOR MEANS; and wherein each said L1 DIGITAL CHANNEL PROCESSING MEANS are synchronously clocked by said SCLK signal; said SCLK timing signal being outputted by said FREQUENCY SYNTHESIZER MEANS; and wherein said MICROPROCESSOR MEANS system is fed by output signals from each said L1 DIGITAL CHANNEL PROCESSING MEANS; and wherein each said L1 DIGITAL CHANNEL PROCESSING MEANS is fed by a control signal from said MICROPROCESSOR MEANS.

5. The system of claim 4, wherein said L1 DIGITAL CHANNEL PROCESSING MEANS further comprises:

a carrier numerically controlled oscillator (CARRIER NCO MEANS);

a CARRIER MIXER MEANS connected to said CARRIER NCO MEANS for multiplying outputted by said IF PROCESSOR MEANS digitized inphase IL1 and Q L1 signals having carrier frequency with, outputted by said CARRIER NCO MEANS, inphase and quadrature components of digital carrier; wherein said CARRIER MIXER MEANS outputs inphase IL1 and quadrature Q L1 signals having zero carrier frequency;

a CODE MIXER and GENERATOR MEANS connected to said CARRIER MIXER for providing a locally generated replica of C/A code;

a CODE MIXER and MEANS connected to said CARRIER MIXER MEANS and connected to said CODE MIXER and GENERATOR MEANS for code-correlating said CARRIER MIXER MEANS output signals with said locally generated replica of C/A code; wherein when said L1 DIGITAL CHANNEL PROCESSING MEANS's carrier tracking loop is closed via said CARRIER NCO MEANS, the input to said CODE MIXER MEANS represents the satellite signal L1 C/A code; and wherein said CODE MIXER MEANS performs said code correlation at 3 time points (early (E), punctual (P), and late (L)) on the autocorrelation function graph creating E, P, and L samples of the autocorrelation function;

a block C/A CODE CORRELATORS MEANS connected to said CODE MIXER MEANS for integrating said early, punctual and late samples of said autocorrelation function over an integer multiple of $C/A_{EPOCH}$ signals; wherein said C/A CODE CORRELATORS MEANS outputs early (E), punctusal (P), and late (L) components of said C/A signal in inphase (I) and quadrature (Q) channels ($E_{I\ C/A}$, $P_{I\ C/A}$, $L_{I\ C/A}$, $E_{Q\ C/A}$, $P_{Q\ C/A}$, $L_{Q\ C/A}$) that are fed to said MICROPROCESSOR SYSTEM MEANS at a rate of L1 $C/A_{EPOCH}$, and wherein said MICROPROCESSOR SYSTEM MEANS uses said C/A CODE CORRELATORS MEANS output signals to facilitate tracking of said C/A signal and to develop feedback signals for the L1 carrier tracking loop and for the L1 code tracking loop; and a P(G) CODE CORRELATORS MEANS connected to said CODE MIXER and GENERATOR MEANS and connected to said C/A CODE CORRELATORS MEANS for generating the signals ($E_{I\ P(G)}$, $P_{I\ P(G)}$, $L_{I\ P(G)}$, $E_{Q\ P(G)}$, $P_{Q\ P(G)}$, $L_{Q\ P(G)}$) that are read by said MICROPROCESSOR SYSTEM to facilitate tracking of the P(G) signal, and to develop feedback signals for the L1 carrier tracking loop and for the L1 code tracking loop.

6. The system of claim 5, wherein said CODE MIXER and GENERATOR MEANS further comprises:

a CODE NCO MEANS using a sampling clock SCLK for generating a first clocking signal at the P code rate, wherein said first clocking signal can be altered using said MICROPROCESSOR CONTROL signal to facilitate the code tracking;

a DIVIDING MEANS connected to said CODE NCO MEANS for dividing said first clocking signal and for generating a second clocking signal at C/A code clocking rate;

a C/A CODE GENERATOR MEANS connected to said first DIVIDING MEANS for generating a C/A code signal and a $C/A_{EPOCH}$ signal under the CONTROL signal of said MICROPROCESSOR MEANS, wherein said C/A code signal is the locally generated C/A code used in C/A tracking, and wherein said $C/A_{EPOCH}$ signal is the repetition rate of said C/A code, and wherein said C/A CODE GENERATOR can be adjusted under said CONTROL signal to generate a particular satellite's C/A code;

a P CODE GENERATOR MEANS connected to said CODE NCO MEANS, wherein said P CODE GENERATOR MEANS is clocked by said first clocking signal under the CONTROL signal of said MICROPROCESSOR MEANS, and wherein said P CODE GENERATOR generates a P code signal, an X1 signal, and a X1A signal for driving a G CODE GENERATOR; and wherein said P CODE GENERATOR can be adjusted under said CONTROL signal to generate a particular satellite's P code;

a W SYNC GENERATOR MEANS connected to said CODE NCO MEANS for dividing said first clocking signal by N, N being an integer, for generating an output signal $W_{Sync}$, and for synchronizing said $W_{Sync}$ signal to said $C/A_{EPOCH}$ signal;

a G CODE GENERATOR connected to said P CODE GENERATOR MEANS and connected to said W SYNC GENERATOR MEANS for generating a G code signal;

a CODE MIXER 1 MEANS connected to said P CODE GENERATOR for mixing I inphase (I) and quadrature (Q) versions of an incoming signal with said locally generated P code signal, and for generating inphase and quadrature, early (E), punctual (P), and late (L), versions of the elected satellite's W code signal ($I_{P\_EPL}$ and $Q_{P\_EPL}$);

a SUMMER DELAY BLOCK MEANS connected to said CODE MIXER 1 MEANS for further processing said $I_{P\_EPL}$ and $Q_{P\_EPL}$ signals by integrating said $I_{P\_EPL}$ and $Q_{P\_EPL}$ signals across the period $W_{Sync}$, and for delaying said integrated $\Sigma I_{P\_EPL}$ and $\Sigma Q_{P\_EPL}$ signals by a variable integer number K of $W_{Sync}$ periods; and a CODE MIXER 2 MEANS connected to said SUMMER DELAY BLOCK and connected to said G CODE GENERATOR MEANS for mixing said generated delayed and integrated $\Sigma I_{P\_EPL}$ and $\Sigma Q_{P\_EPL}$ signals with said G code signal, and for generating output signals $I_{EPL}$ and $Q_{EPL}$ for further integration in said P(G) CODE CORRELATORS BLOCK.

7. The system of claim 6, wherein said DIVIDING MEANS connected to said CODE NCO MEANS for dividing said first clocking signal and for generating a second clocking signal at C/A code clocking rate comprises a DIVIDE BY 10 BLOCK.

8. The system of claim 7, wherein said W SYNC GENERATOR MEANS connected to said CODE NCO MEANS comprises a W SYNC BLOCK for dividing said first clocking signal by 22.

9. The system of claim 6, wherein said CODE MIXER 1 further comprises:

a first MIXER for mixing an inphase (I) component of an incoming signal with an early (E) version of said locally generated P code signal;

a second MIXER for mixing an inphase (I) component of an incoming signal with a punctual (P) version of said locally generated P code signal;

a third MIXER for mixing an inphase (I) component of an incoming signal with a late (L) version of said locally generated P code signal; wherein an inphase early, an inphase punctual, and an inphase late version $I_{P\_EPL}$ represents an inphase version I of the elected satellite's W code signal;

and a fourth MIXER for mixing a quadrature (Q) component of an incoming signal with an early (E) version of said locally generated P code signal;

a fifth MIXER for mixing a quadrature (Q) component of an incoming signal with a punctual (P) version of said locally generated P code signal; and a sixth MIXER for mixing a quadrature (Q) component of an incoming signal with a late (L) version of said locally generated P code signal; wherein a quadrature early, a quadrature punctual, and a quadrature late versions $Q_{P\_EPL}$ represent a quadrature version Q of the elected satellite's W code signal.

10. The system of claim 6, wherein said SUMMER DELAY BLOCK MEANS further comprises:

a DIGITAL SUMMER 1, a DIGITAL SUMMER 2, and a DIGITAL SUMMER 3 for integrating said inphase version I of the elected satellite's W code signal $I_{P\_EPL}$ across the period $W_{Sync}$; and a DIGITAL DELAY 1, a DIGITAL DELAY 2, and a DIGITAL DELAY 3 for delaying said integrated $\Sigma I_{P\_EPL}$ by a variable integer number of $W_{Sync}$ periods;

and a DIGITAL SUMMER 4, a DIGITAL SUMMER 5, and a DIGITAL SUMMER 6 for integrating said quadrature version Q of the elected satellite's W code signal $Q_{P\_EPL}$ across the period $W_{Sync}$; and a DIGITAL DELAY 4, a DIGITAL DELAY 5, and a DIGITAL DELAY 6 for delaying said integrated $\Sigma Q_{P\_EPL}$ by a variable integer number of $W_{Sync}$ periods.

11. The system of claim 6, wherein said G CODE GENERATOR further comprises:

a W CODE GENERATOR MEANS for generating a W code with an unknown variable underlying clocking rate;

a DIGITAL SUMMER MEANS connected to said W CODE GENERATOR MEANS for integrating said W code signal across the period $W_{Sync}$; wherein a top bit of said integrated signal forms a G code signal; and wherein said variable underlying clocking rate of said W code signal is masked with said period of $W_{Sync}$; said constant period $W_{Sync}$ being equal to the inverse zero-frequency $1/F_0$ of the W-code energy spectrum, and wherein said zero-frequency $F_0$ is the first frequency at which said W-code energy spectrum is equal to zero; and wherein said G code signal comprises a string of '1's and '0's at a rate of $W_{Sync}$ clocks; and wherein said $W_{Sync}$ clock signal is synchronized to said $C/A_{EPOCH}$ signal; and a DIGITAL DELAY connected to said DIGITAL SUMMER MEANS for variably delaying said G code by K Wsync clocks in order to prevent the effective transmission of a spoofing signal.

12. The system of claim 6, wherein said W SYNC GENERATOR MEANS further comprises:

a ZERO FREQUENCY $F_0$ MEANS for multiplying said NCO clocking signal by the zero frequency $F_0$ of the W-code energy spectrum;

wherein said zero-frequency $F_0$ is the first frequency at which said W-code energy spectrum is equal to zero; and wherein said W SYNC GENERATOR MEANS generates said $W_{Sync}$ clock signal.

13. The system of claim 12, wherein said ZERO FREQUENCY $F_0$ MEANS further comprises a DIVIDE BY 22 MEANS; and wherein said W SYNC GENERATOR MEANS generates a 22 P(Y) clock signal; and wherein said $W_{Sync}$ clock signal is synchronized to said $C/A_{EPOCH}$ signal.

14. The system of claim 6, wherein said CODE MIXER 2 further comprises:

a first MIXER BLOCK for mixing said delayed and integrated inphase $\Sigma I_{P\_EPL}$ signals with said G code signal, and for generating output signals $I_{EPL}$ for further integration in said P(G) CODE CORRELATORS BLOCK; and a second MIXER BLOCK for mixing said delayed and integrated quadrature $\Sigma Q_{P\_EPL}$ signals with said G code signal, and for generating output signals $Q_{EPL}$ for further integration in said P(G) CODE CORRELATORS BLOCK.

15. The system of claim 10, wherein said DIGITAL SUMMER MEANS further comprises:

an ADDER MEANS for inputting an input signal $SIGNAL_{IN}$;

a LATCH 1 MEANS connected to said ADDER 1 MEANS, wherein said $W_{Sync}$ signal clears said LATCH 1 for preparation for the next accumulation; and wherein said LATCH 1 and said ADDER perform the accumulation of said input signal $SIGNAL_{IN}$ over the period of $W_{Sync}$ signal;

a LATCH 2 MEANS connected to said LATCH 1 MEANS and connected to said ADDER 1 MEANS for latching in said $W_{Sync}$ signal; and a COMPARATOR connected to said LATCH 2 MEANS for producing an output $W_{out}$ signal; wherein said $W_{out}$ signal is equal to the MSB (most significant bit of the input signal accumulation $\Sigma(SIGNAL_{IN})$ over the period of a $W_{Sync}$ signal.

16. The system of claim 10, wherein said DIGITAL DELAY MEANS further comprises:

a SHIFT REGISTER MEANS for delaying an input signal by an integer number M of $W_{Sync}$ clocks; and a MULTIPLEXER MEANS connected to said SHIFT REGISTER MEANS for selecting said integer number M under a CONTROL signal.

17. A method for utilizing the satellite-transmitted P(Y) signal without requiring the detailed P(Y) code to be revealed inside the receiver, said method comprising the steps of:

receiving a known C/A code modulated on L1 carrier frequency;

receiving an unknown Y code modulated on L1 carrier frequency signal;

receiving an unknown Y code modulated on L2 carrier frequency signal from at least one satellite; wherein said received L1, and L2 signals contain propagation noise; and wherein said Y code comprises a known P code and an unknown W code;

locally generating replica of said C/A code modulated on L1 carrier frequency signal;

locally generating replica of said P code modulated on L1 carrier frequency signal;

locally generating replica of said P code modulated on L2 carrier frequency signal;

locally generating replica of a L1 G code whose power spectrum characteristics are similar to the unknown W code modulated on L1 carrier frequency signal;

locally generating replica of a L2 G code whose power spectrum characteristics are similar to the unknown W code modulated on L2 carrier frequency signal;

correlating a locally generated replica of C/A code with the received L1 code for obtaining an estimate of L1 group delay (L1 pseudo-range) and L1 carrier phase; and demodulating of the satellite data stream.

* * * * *